United States Patent
Dreibelbis et al.

(10) Patent No.: US 8,839,167 B1
(45) Date of Patent: Sep. 16, 2014

(54) REDUCING RUNTIME AND MEMORY REQUIREMENTS OF STATIC TIMING ANALYSIS

(71) Applicant: International Business Machines Corporation, Armonk, NY (US)

(72) Inventors: Brian Dreibelbis, Underhill, VT (US); John P. Dubuque, Jericho, VT (US); Eric A. Foreman, Fairfax, VT (US); David J. Hathaway, Underhill, VT (US); Jeffrey G. Hemmett, St. George, VT (US); Natesan Venkateswaran, Hopewell Junction, NY (US); Chandramouli Visweswariah, Croton-on-Hudson, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/855,226

(22) Filed: Apr. 2, 2013

(51) Int. Cl.
*G06F 17/50* (2006.01)

(52) U.S. Cl.
CPC .................. *G06F 17/5068* (2013.01)
USPC ....................................................... 716/108

(58) Field of Classification Search
CPC .............. G06F 17/505; G06F 17/5031; G06F 17/5022; G06F 17/5045; G06F 17/5068; G06F 2217/10

USPC ........................................... 716/108, 113, 134
See application file for complete search history.

(56) References Cited

U.S. PATENT DOCUMENTS

| | | | |
|---|---|---|---|
| 5,636,130 A | 6/1997 | Salem et al. | |
| 6,367,056 B1 | 4/2002 | Lee | |
| 6,654,938 B2 | 11/2003 | Kosugi | |
| 7,448,009 B2 | 11/2008 | Pundoor | |
| 7,979,820 B1 | 7/2011 | Patzer et al. | |
| 8,079,004 B2 | 12/2011 | Soviani et al. | |
| 8,086,976 B2 | 12/2011 | Hemmett et al. | |
| 8,122,411 B2 | 2/2012 | Abbaspour et al. | |
| 2007/0180415 A1* | 8/2007 | Pundoor | 716/6 |
| 2013/0145333 A1* | 6/2013 | Buck et al. | 716/113 |

* cited by examiner

*Primary Examiner* — Vuthe Siek
(74) *Attorney, Agent, or Firm* — David Cain; Roberts Mlotkowski Safran & Cole, P.C

(57) ABSTRACT

Systems and methods for performing static timing analysis during IC design. A method is provided that includes obtaining canonical input data. The method further includes calculating at least one input condition identifier based on the canonical input data. The method further includes comparing the at least one input condition identifier to a table of values. The method further includes that when a match exists between the at least one input condition identifier and at least one value within the table of values, retrieving previously calculated timing data associated with the at least one value, and applying the previously calculated timing data in a timing model for a design under timing analysis.

19 Claims, 7 Drawing Sheets

REDUCING RUNTIME AND MEMORY REQUIREMENTS OF STATIC TIMING ANALYSIS

FIELD OF THE INVENTION

The invention relates to systems and methods for integrated circuit (IC) design and fabrication and, more particularly, to systems and methods for performing static timing analysis during IC design.

One dominant form of performance analysis that is used during integrated circuit (IC) design is static timing analysis (STA). STA is an important process by which one identifies any circuit races/hazards, which could cause a chip to malfunction, verifies the operational speed of a chip, and identifies the paths, which limit the operational speed of the IC. STA typically operates on a timing graph, in which nodes represent electrical nodes (e.g., circuit pins) at which signals may make transitions at various times, and edges, or segments, representing the delays of the circuits and/or wires connecting the nodes. Although it may report performance-limiting paths, typical STA methods do not actually operate on paths (of which there may be an exponentially large number), and instead use a "block-based" approach to compute and propagate forward signal arrival times reflecting the earliest and/or latest possible times that signal transitions can occur at nodes in the timing graph. As a result, STA is efficient, allowing for rapid estimation of IC timing on very large designs as compared to other approaches (e.g., transient simulation).

An important aspect of STA is evaluation of timing tests, which are required ordering relationships between the arrival times of signals on converging paths. These are often represented in a timing graph as test edges, or segments. Common examples of timing tests are setup tests, requiring that a data signal at an input of a flip-flop or other memory element becomes stable for some setup period before the clock signal transition that stores that data (i.e., that the latest possible data transition in a clock cycle occur at least the required setup period before the earliest possible clock transition for that cycle), and hold tests, requiring that a data signal at an input of a flip-flop or other memory element remain stable for some hold period before the clock signal transition that stores that data (i.e., that the earliest possible data transition in a clock cycle occur at least the required hold period after the latest possible clock transition for the preceding clock cycle). Pairs of paths along which early and late arrival times compared in a timing test are propagated are often referred to as racing paths.

It is commonly recognized that electrical characteristics of transistors and interconnects are not the same for different IC chips and even for the same chip at different periods of time or chip locations. Variation of electrical characteristics can be due to variation of process parameters, changing of environmental conditions and even chip age (e.g., Hot Carriers Injections, Negative Bias Temperature Instability, electromigration, and so forth). The variation of electrical characteristics results in variations of gate timing characteristics. Traditional deterministic STA may typically be performed at a particular "corner," which is a specified combination of conditions such as voltage, temperature, and manufacturing process that affect delays of circuits on a chip. However, the timing results can vary widely between corners as changes in temperature, voltage, process, etc. can have a strong affect on the delays through the IC components. The traditional conservative way to handle these variations is to perform multiple STA runs at all so-called process corners at which the gates may have the worst combinations of delays. Then chips are designed so that they can properly function at all process corners assuming that as a result they will function at any other combination of gate delays.

However, with decreasing transistor size and interconnect width, the variation of electrical characteristics is becoming proportionally larger. Therefore, the multi-corner analysis approach results in too conservative and non-optimal designs because most design efforts and chip resources are spent to make chips function at very low-probability combinations of electrical characteristics. Additionally, the fixing of failed timing tests in one process corner may lead to new timing test failures in other corners, requiring a costly iterative design process.

An alternative approach to designing chips is to consider actual statistical characteristics of process parameter variations and use them to compute statistical characteristics of a designed circuit. This approach is referred to as the Statistical Static Timing Analysis (SSTA) approach.

SSTA explicitly propagates mean timing values and sensitivities of these timing values to sources of variation through the timing graph, based on modeled variability information contained in asserted timing constraints and the delay models. These sensitivities may then cancel when arrival time differences are computed at test slack calculation time, providing pessimism reduction during the original block based timing analysis. Statistical min/max operations are used to compute the early and late mode arrival times, respectively, when paths converge, including computing both new mean values and sensitivities to various parameters. As the distributions propagated represent functions rather than discrete numerical values, operations such as addition and subtraction, and in particular max and min, can be very computationally extensive and expensive as compared to traditional deterministic timing. While the individual runs are more costly, the net cost can be less than multiple single corner runs, which may also minimize design iterations as any fixes that occur may be applicable across the full process space covered. Regardless of the timing approach used, the runtime required to perform timing analysis impacts the number of design iterations required, and there is strong interest in keeping the runtime to a minimum. Therefore, methods that can reduce runtime while maintaining timing accuracy are desirable.

Accordingly, there exists a need in the art to overcome the deficiencies and limitations described hereinabove.

SUMMARY

In a first aspect of the invention, a method is provided that includes obtaining canonical input data. The method further includes calculating at least one input condition identifier based on the canonical input data. The method further includes comparing the at least one input condition identifier to a table of values. The method further includes that when a match exists between the at least one input condition identifier and at least one value within the table of values, retrieving previously calculated timing data associated with the at least one value, and applying the previously calculated timing data in a timing model for a design under timing analysis.

In another aspect of the invention, a method is provided for performing timing analysis. The method includes obtaining canonical input data. The method further includes calculating and applying at least one slew identifier based on the canonical input data. The method further includes comparing the at least one slew identifier to a table of values. The method further includes that when the at least one slew identifier is a match to at least one value within the table of values, comparing the obtained canonical input data to canonical input data associated with the at least one value. The method further includes that when the at least one slew identifier is not a match to the at least one value within the table of values, calculating timing data for the at least one slew identifier and saving the at least one slew identifier as a value in the table of values. The method further includes that when the obtained canonical input data matches the canonical input data associated with the at least one value, retrieving previously calculated timing data associated with the at least one value. The method further includes applying the previously calculated timing data in a timing model for a design under timing analysis.

In yet another aspect of the invention, a computer program product is provided comprising a computer readable storage medium having readable program code embodied in the storage medium. The computer program product includes at least one component operable to obtain canonical input data. The at least one component is further operable to calculate at least one input condition identifier based on the canonical input data. The at least one component is further operable to compare the at least one input condition identifier to a table of values. The at least one component is further operable such that when the at least one input condition identifier is a match to at least one value within the table of values, its compares the obtained canonical input data to canonical input data associated with the at least one value. The at least one component is further operable such that when the at least one input condition identifier is not a match to the at least one value within the table of values, it calculates timing data for the at least one input condition identifier, saves the at least one input condition identifier as a value in the table of values, and applies the calculated timing data for the at least one input condition identifier in a timing model for a design under timing analysis. The at least one component is further operable such that when the obtained canonical input data matches the canonical input data associated with the at least one value, it retrieves previously calculated timing data associated with the at least one value and applies the previously calculated timing data in the timing model for the design under timing analysis.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

Figure 1:
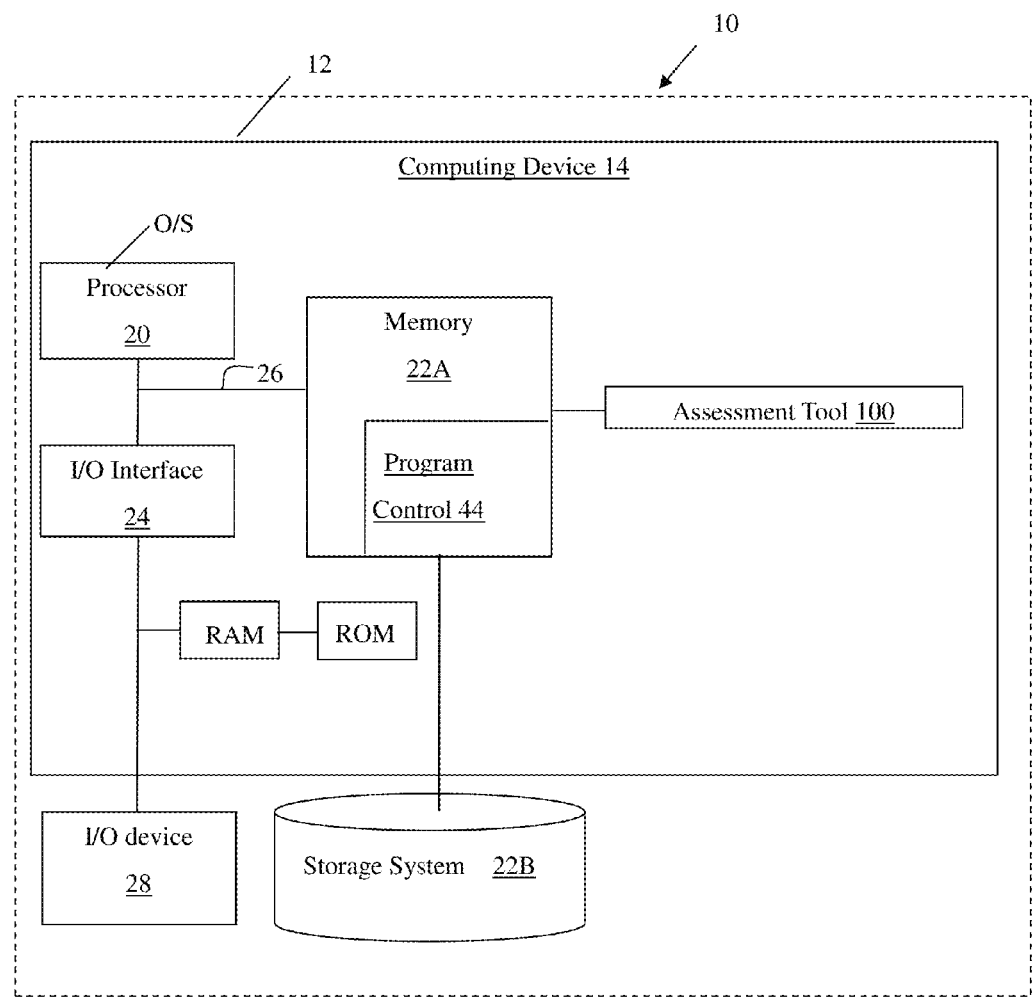
FIG. 1 is an illustrative external environment for implementing the invention in accordance with aspects of the invention.

The invention relates to systems and methods for IC design and fabrication and, more particularly, to systems and methods for performing static timing analysis during IC design. Implementations of the present invention provide improved SSTA techniques that are designed to significantly reduce a number of probability distributions computed for arc delays in conventional SSTA. For example, aspects of the present invention recycle existing solutions for delays (how long it takes a signal to transition through a book), output slews (ramp or transition time at output of the book), and/or guard times (measure of how long it takes to latch) calculated under "similar input conditions." Advantageously, these approaches may also be applied in traditional deterministic STA, where deterministic delay, slew, and guard time calculations may be avoided through recycling of existing results calculated under similar input conditions. More advantageously, the recycling of the existing solutions allows embodiments of the present invention to efficiently avoid calculations that would conventionally result in known solutions and avoid storing duplicate solutions in memory to realize a net gain of results either substantially identical to fully computed results, or less pessimistic to fully computed results.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard, etc.

In general, the processor 20 executes computer program code (e.g., program control 44), which can be stored in the memory 22A and/or storage system 22B. Moreover, in accordance with aspects of the invention, the program control 44 controls an assessment tool 100 to perform the processes described herein. The assessment tool 100 can be implemented as one or more program code in the program control 44 stored in memory 22A as separate or combined modules. Additionally, the assessment tool 100 (e.g., an EDA tool) may be implemented as separate dedicated processors or a single or several processors to provide the function of this tool. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In embodiments, the assessment tool 100 can calculate at least one input condition identifier and compare the at least one input condition identifier to a table of values, thereafter, apply new or previously calculated timing data in a timing model for a design under timing analysis based on the results of the comparison. For example, in accordance with aspects of the invention, the assessment tool 100 can obtaining canonical input data, calculate at least one input condition identifier based on the canonical input data, compare the at least one input condition identifier to a table of values, and when a match exists between the at least one input condition identifier and at least one value within the table of values, retrieve previously calculated timing data associated with the at least one value, and apply the previously calculated timing data in a timing model for a design under timing analysis.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, computing infrastructure 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagrams

FIGS. 2 and 5-7 show exemplary flows for performing aspects of the present invention. The steps of FIGS. 2 and 5-7 may be implemented in the environment of FIG. 1, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

IC Design Flow

Aspects of the present invention pertain to IC design and fabrication. As should be understood by those of skill in the art, the process for the design and fabrication of an IC may start with the design of a product idea (e.g., a chip design), which may be realized using EDA software such as that described above with respect to FIG. 1. When the design is finalized, it can be taped-out. After tape-out, the fabrication process is consummated and packaging and assembly processes are performed which ultimately result in finished chips.

Figure 2:
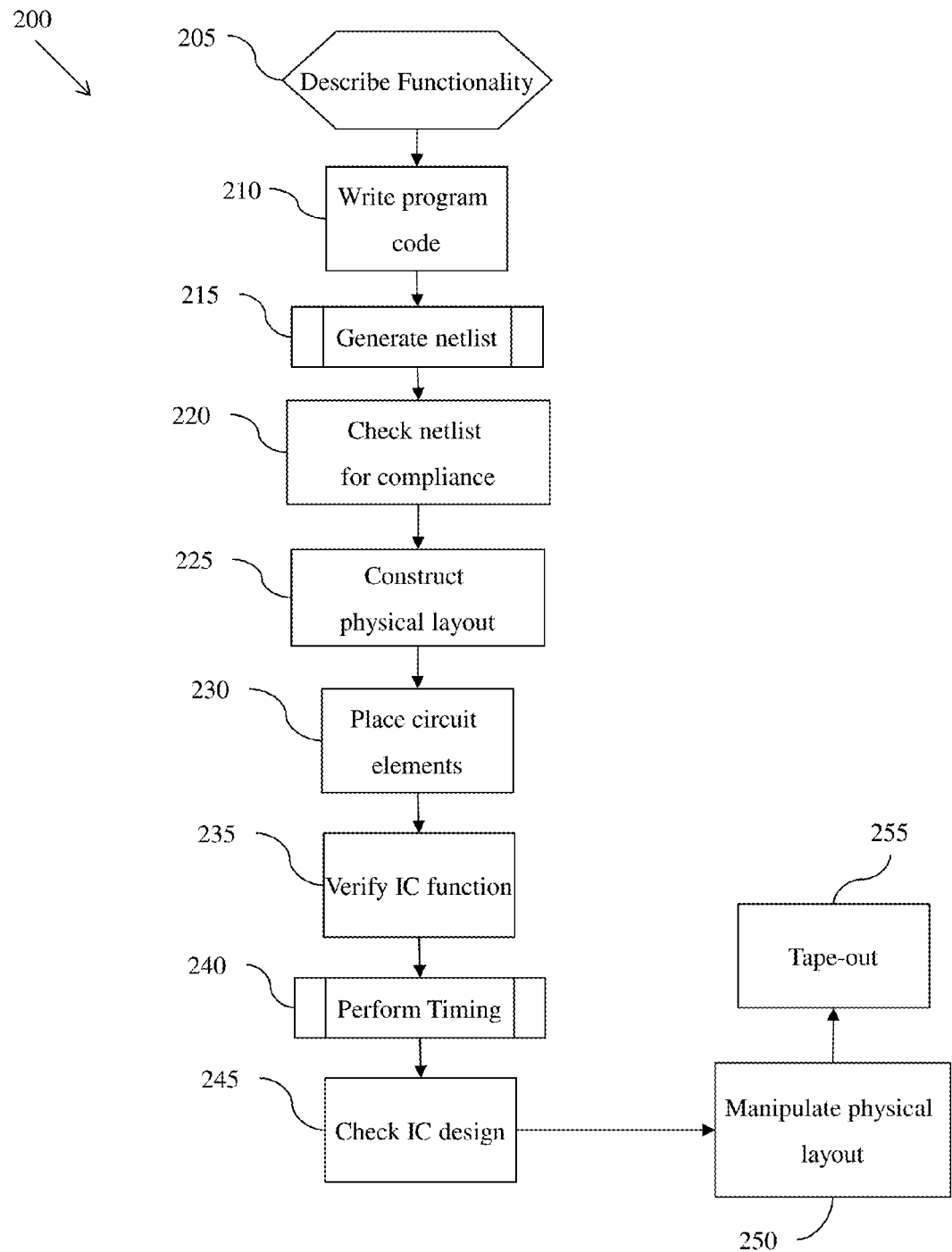
FIG. 2 is an illustrative process flow of implementing the system in accordance with aspects of the invention.

As shown in FIG. 2, the EDA software design process 200 may comprise multiple stages, which are described below. However, it should be noted that this IC design flow description is for illustration purposes only. This description is not meant to limit the present invention. For example, an actual IC design may require a designer to perform the design stages in a different sequence than the sequence described herein.

As shown in FIG. 2, the EDA software design process 200 may start at step 205 where a designer describes the functionality to be implemented using the product idea. Additionally, the designer may perform what-if planning to refine or optimize the functionality of the product idea and to check costs. At step 210, program code for modules in the system may be written and the IC design may be checked for functional accuracy. For example, the modules may be written using lower-level HDL design languages such as Verilog and VHDL, and thereafter, the design may be checked to ensure that it produces predictable outputs.

At step 215, the program code (e.g., the Verilog/VHDL modules) may be translated to a netlist. The netlist may comprise, for example, compiled or otherwise processed data structures representing a list of wires, discrete components, logic gates, control circuits, I/O devices, models, etc. that describes the connections to other elements and circuits in the IC design. The netlist may be optimized for the target technology. Additionally, tests may be designed and implemented to check the finished chips. At step 220, the netlist may be checked for compliance with timing constraints and for correspondence with the program code (e.g., the VHDL/Verilog modules). At step 225, an overall physical layout plan for the chip may be constructed and analyzed for timing and top-level routing. At step 230, circuit elements may be placed or position using the physical layout plan and routing or connection of the circuit elements may be completed.

At step 235, the IC function may be verified at a transistor level and an optional what-if refinement may be implemented to optimize the IC functionality. At step 240, STA or SSTA may be performed in which the netlist is checked for compliance with timing constraints and for correspondence with the program code (e.g., the VHDL/Verilog modules). At step 245, the IC design may be checked to ensure correctness for manufacturing, electrical issues, lithographic patterning issues, and circuitry. At step 250, geometric shape and/or sizing manipulations of the physical layout may be implemented to improve manufacturability of the IC design. At step 255, the IC design may be taped-out for production of masks to produce finished chips.

Static Timing Analysis

Embodiments of the present invention can be implemented during one or more of the above-described steps within the EDA software design process 200. Specifically, one embodiment of the present invention can be used during the timing verification step 240. In order to understand timing analysis and the processes described hereafter it should be understood that a path is a sequence of logic gates connected together. An arc or segment in the path is a unique physical path through a logic gate. The arc or segment in the path may have multiple signals moving along the unique physical path that are differentiated by phase. Each phase may be differentiated by tags that are conventionally input by designers and included in the design assertions of the netlist.

STA verifies timing by computing the worst-case and the best-case delays without enumerating all possible paths of an IC design. During the timing verification stage of the IC design process, both a graph-based STA and a path-based analysis may be implemented to check for compliance with timing constraints. A graph-based STA is a fast timing verification approach, but the results are often pessimistic. A path-based STA may be implemented to provide less pessimistic estimates for timing slacks than the graph-based STA. The path-based slacks are generally less pessimistic because they do not use the worst slew at each merge point in the timing graph, as required by graph-based analysis.

Figure 3:
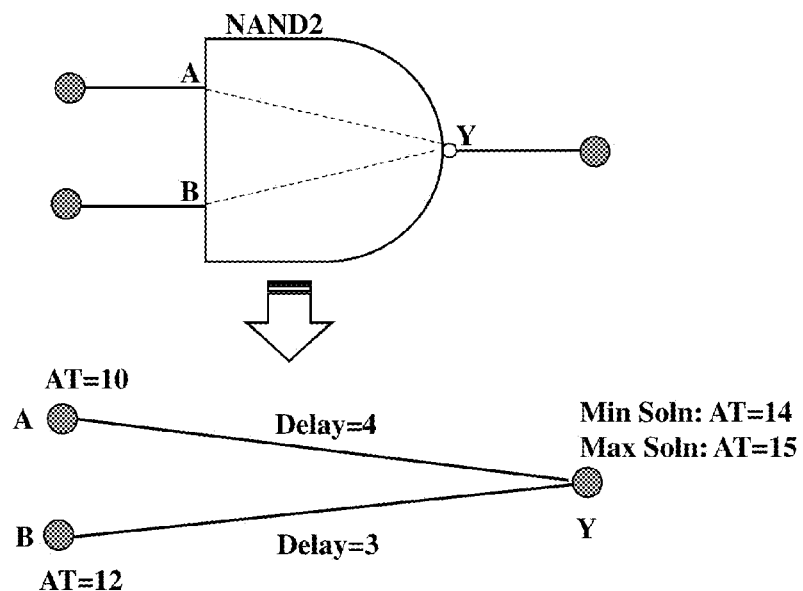
FIGS. 3 and 4 are logical representations that are decomposed into arcs with respective delays for purposes of illustrating timing analysis.

As illustrated in FIG. 3, path-based STA determines if signals arrive too early or too late to satisfy timing requirements. Specifically, FIG. 3 illustrates that STA computes best case and worst case arrival times (e.g., Min Soln: AT=14 and Max Soln: AT=15) of various physical paths (e.g., arc AY and arc BY) through logic using initial arrival times (e.g., AT=10 and AT=12) and arc delays computed (e.g., arc delays AY=4 and BY=3) using timing rules. The best case and worst case arrival times (i.e., deterministic data) are then propagated to timing points such that cumulative effects of arc delay within the IC design may be computed to determine if signals arrive too early or too late to satisfy timing requirements.

In SSTA, the arc delays are considered a random variable and the objective of SSTA is to compute their probability distribution. From the cumulative distribution function of each arc delay, the user is then able to obtain the percentage of chips, which meet a certain delay requirement, or conversely, the expected performance for a particular yield of chips. Specifically, SSTA assumes that manufacturing and environmental variations are random and therefore they behave statistically. Applying this assumption, SSTA models chip timing statistically. It approximates timing accurately in the regions of highly probable values of variations while allowing higher error in low probable regions of the variations. Conventionally, the delays of gates and wires in the chip are modeled in linear canonical form of variational parameters, which is simple and efficient to propagate through the circuit.

Figure 4:
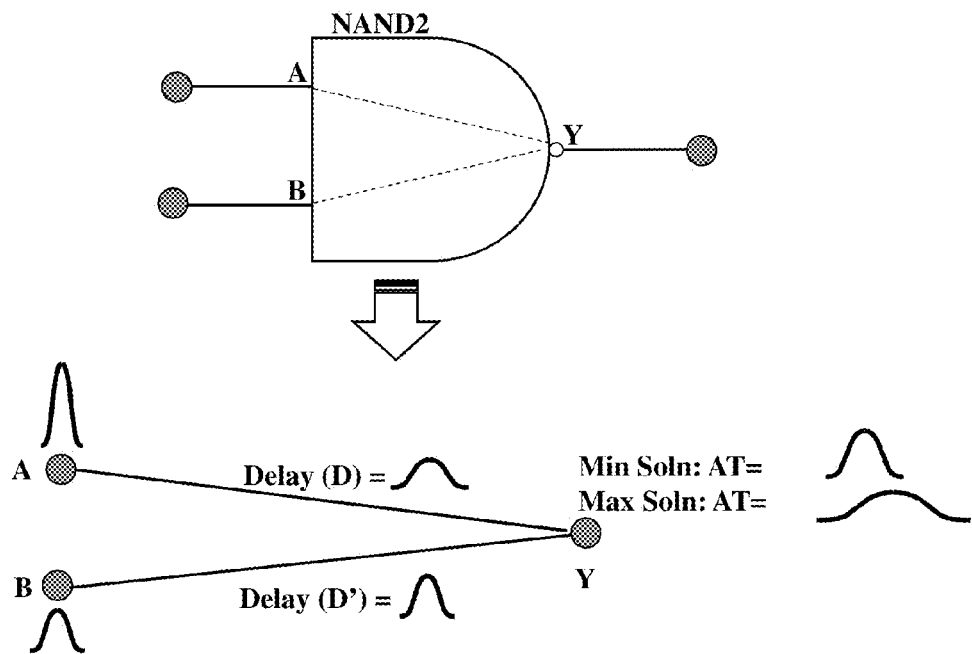

As illustrated in FIG. 4, the conventional linear approach to SSTA propagates distribution delay data rather than deterministic delay data (i.e., single values) as is performed in STA. Specifically, FIG. 4 illustrates the delay D for a first exemplary logic path (e.g., arc AY) as a function of at least two sources of variation (X and Y), and the delay D' for a second exemplary logic path (e.g., arc BY) also as a function of at least the two sources of variation (X and Y). The at least two sources of variation X and Y in this case are linear and may be set to any value within a range of values (i.e., $X_1$-$X_2$ and $Y_1$-$Y_2$, respectively). The delays may be modeled in linear canonical form as $D(Y,X)=d_0+d_y\Delta Y+d_x\Delta X$ and $D'(Y,X)=d_0+d_y\Delta Y+d_x\Delta X$. The delay sensitivities $d_x$ and $d_y$ may be computed by finite differencing. The delay sensitivities $d_x$ and $d_y$ also may be computed by differentiating delays of gates and wires with respect to variational variables. In some cases, the sensitivities of delays and slews can be assigned (asserted) assuming known percentage of variability, without explicit finite differencing or computing the derivatives. The best case and worst case arrival times probability distributions are then propagated to timing points such that the cumulative effects of each arc delay probability distribution within the IC design may be computed to determine the percentage of chips, which meet a certain delay requirement, or conversely, the expected performance for a particular yield of chips.

Although, the worst-case and the best-case arc delays are determined in both STA and SSTA without enumerating all possible paths, it should be understood to those of skill in the art that the distributions propagated in SSTA represent functions rather than discrete numerical values as in STA. Therefore, the operations performed in SSTA such as addition and subtraction, and in particular max and min, can be computationally extensive (e.g., each calculation may consist of a mean and a summation of statistical sensitivities) and costly as compared to traditional deterministic timing. For example, the calculation of the statistical delay models to be propagation may be significantly more costly, as each delay model comprises a multi-dimensional Joint Probability Distribution Function (JPDF), rather than a single deterministic value, adding to the overall cost of the SSTA approach. More specifically, the complexity of the operations performed in conventional SSTA decreases the designer's productivity, complicates the resolution of tool issues, increases the odds of peripheral sources of failure, and increases memory requirements (e.g., memory 22A or storage system 22B as discussed with respect to FIG. 1).

Accordingly, embodiments of the present invention provide improved SSTA techniques that are designed to significantly reduce the number of JPDFs that must be computed to statistically model the delays, slews, and guard times used in conventional SSTA. For example, aspects of the present invention recycle existing solutions (e.g., solutions for arc delays and slews) calculated under "similar input conditions." The recycling of the existing solutions allows embodiments of the present invention to efficiently avoid calculations that would conventionally result in known solutions and avoid storing duplicate solutions in memory to realize a net gain of results either substantially identical to fully computed results, or less pessimistic to fully computed results.

Specifically, aspects of the present invention identify "similar input conditions" where the same solutions (e.g., arc delays, output slews, or guard times) are calculated repeatedly over multiple clock phases being propagated through the IC design, and instead the solutions are calculated only once for the different clock phases (e.g., the clock phases being different signals propagated inside the design in a giving timing run). It should be understood that the solutions (e.g., the delays and slews or output slews) are a function of the input conditions (e.g., load and source slew). However, load is a complex function comprising output slews, nets, and loading gates, and source slew is a canonical model, and thus not a single value. Consequently, full compares of input conditions comprising loads and source slews to identify "similar input conditions" may potentially require a large number of complex compares and may become costly such that the efficiency obtained from avoiding calculations that would result in known solutions becomes outweighed by the inefficient full compares. Accordingly, embodiments of the present invention reduce the number and complexity of the compares using similar instances of input conditions known by construction or definition, or known by regularities, and/or using a hash table system.

Specifically, in embodiments, similar instances of input conditions (e.g., load conditions) known by construction or definition may be identified such that input conditions (e.g., the load) may be dropped from the comparison. For example, load conditions over a single arc comprising multiple clock phases are similar for each phase by construction or definition, and thus the load variable may be dropped from the comparison without affecting the accuracy of the comparison.

Figure 5:
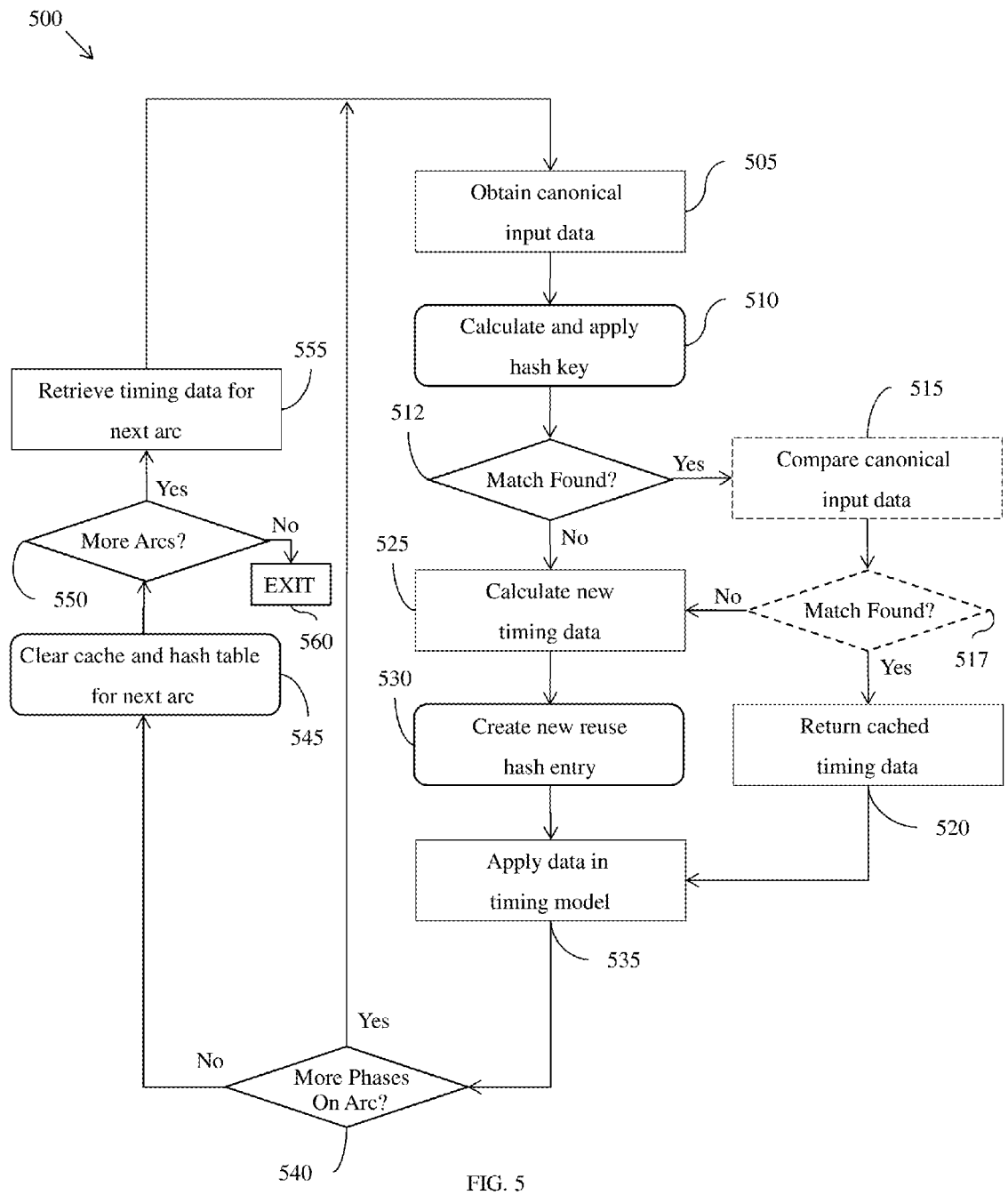
FIGS. 5-7 are illustrative process flows of implementing the system in accordance with aspects of the invention.

As shown in FIG. 5, the process 500 may start at step 505 where canonical input data or conditions are obtained for an exemplary phase on an arc. Specifically, canonical inputs for the calculation of the solution (e.g., the delays and slews or output slews) for the exemplary phase may be obtained. In accordance with aspects of this embodiment, the canonical inputs may include the source or input slew(s) and/or data to calculate the source or input slew(s). The load is not used because the input conditions of the phases are only being compared in a same arc instance, and thus the same load applies by construction.

At step 510, at least one input condition identifier or hash key is calculated and compared to values within the hash table. The hash table, if populated, contains possible existing solutions that may be recycled if the input conditions are found to be similar. The hash table may used as an efficient means to retrieve this recyclable data, and the hash key may be a single-valued numerical quantity calculated such that it has a high probability of finding existing solutions that were calculated under similar conditions. Specifically, a single value or multiple single values may be calculated based on the canonical input data or conditions (e.g., the source or input slew), and that single value or multiple single values may be compared to values already stored in the hash table for a potential match. In embodiments, the at least one input condition identifier or hash key may be a single value or multiple single values representative of the STA deterministic delay/output slew calculation inputs (e.g., the source or input slew). In alternative or additional embodiments, the at least one input condition identifier or hash key may be a single value or multiple single values representative of term(s) used in SSTA canonical delay/output slew calculation (e.g., the source slew mean and/or sensitivities, or some combination thereof) (e.g., the canonical model of the source or input slew=$M+\delta D/\delta P_1 * P_1 + \delta D/\delta P_2 * P_2 + \ldots + \delta D/\delta P_N * P_N + \delta D/\delta R * R$, where M is the mean and $\delta$ are statistical sensitivities). Specifically, the mean and/or sensitivities calculated for the canonical model of the source or input slew, or some combination thereof may be used as the at least one input condition identifier or hash key during the SSTA.

Optionally, the at least one input condition identifier or hash key may be calculated prior to the comparison with the hash table to tune the accuracy versus the performance of the comparison by allowing for fuzz or noise in the equivalence definition via variable tolerances. In embodiments, the at least one input condition identifier or hash key may be calculated as a single value or multiple single values via at least one of summation, user definable scalar, and an integer cast of the source or input slew data. For example, the source or input slew=$12.3456+0.789*P_{1+1.01112}*P_2-1.314*P_3$, may be calculated as a summation=12.83172, which may be scaled by e.g., 100, such that the source or input slew retains a 0.01 ps granularity, and further integer cast to obtain a single value of 1283 for the at least one input condition identifier or hash key. This allows source slews that contain subtle differences to arrive at the same hash key via a user definable granularity, potentially expanding the opportunity for re-use at some controllable accuracy cost. In alternative or additional embodiments, the at least one input condition identifier or hash key may be calculated as a single value or multiple single values via summation having a defined limit below which sensitivity data may be excluded to minimize cumulative numerical noise effects. For example, the source or input slew=$12.3456+0.789*P_{1+1.01112}*P_2-1.314*P_{3+0.0000459}*P_{4+0.0000192}*P_4$, may be calculated as a summation=12.83172 for the at least one input condition identifier or hash key because of a defined limit of 0.00005 below which the sensitivity data including $0.0000459*P_{4+0.0000192}*P_4$ is excluded to minimize cumulative numerical noise effects. Advantageously, the utilization of the hash key and hash table mitigates a potential to accumulate an extremely large number of unique input conditions (e.g., source or input slew conditions).

At step 512, a determination is made as to whether the at least one input condition identifier or hash key matches at least one value within the hash table. When the determination is that there is a match, the process continues at optional step 515 or step 520. When the determination is that there is no match, the process continues at step 525.

Optionally, at step 515, when the at least one input condition identifier or hash key matches a value in the hash table, a full comparison of the canonical input data or conditions received in step 505 for the exemplary phase may be compared to the canonical input data or conditions cached and associated with the value in the hash table that had equivalence with the at least one input condition identifier or hash key. For example, the value in the hash table that had equivalence with the at least one input condition identifier or hash key may be used to retrieve canonical input data or conditions associated with the value in the hash table from a cache or memory. Thereafter, the retrieved canonical input data or conditions associated with the value in the hash table may be compared to the canonical input data or conditions obtained in step 505 for the exemplary phase for a potential match. Advantageously, by performing the full comparison after performing the initial screening comprising the hash table, a large number of complex full compares may be avoided such that efficiencies obtained from avoiding calculations that would result in known solutions outweigh the time and resources spent on the full compares.

Optionally, the full comparison may utilize different fuzz or noise factors for different statistical parameters (e.g., different factors for mean, first order sensitivities, cross term, etc.) to allow for fuzz or noise in the equivalence definition via variable tolerances. The fuzz or noise factors may be defined on an absolute and/or percentage basis. For example, during an approximation mode, which may occur during circuit or chip optimization, it may be beneficial to apply broad fuzz or noise factors since accuracy of the full comparison is less of a concern. However, during a precision mode, which may occur during circuit or chip sign off, it may be beneficial to apply little to no fuzz or noise factors since accuracy of the full comparison is more important to determine the percentage of circuits or chips, which meet a certain delay requirement, or conversely, the expected performance for a particular yield of circuits or chips.

At step 517, a determination is made as to whether the canonical input data or conditions received in step 505 match the canonical input data or conditions cached and associated with the value in the hash table. When the determination is that there is a match, the process continues at step 520. When the determination is that there is no match, the process continues at step 525.

At step 520, when the at least one input condition identifier or hash key matches a value in the hash table, and/or when the canonical input data or conditions obtained in step 505 matches the canonical input data or conditions associated with the value in the hash table (e.g., in the instance that the full compare is performed in optional step 515), the timing data or canonical models (e.g., the solution comprising the delays and slews or output slews) already calculated and associated with the value in the hash table is retrieved from the cache or memory.

In some embodiments, the timing data or canonical models retrieved may comprise a plurality of timing data or canonical models. For example, in certain instances different data or canonicals may produce a same hash key, e.g., $10.0=5+1*P1+2*P2+2*P3$ and $10.0=4.0\ 2*P1\ 0*P2+4*P3$. In these instances, the plurality of timing data or canonical models may be associated with the single hash key such that retrieval of the timing data or canonical models for that hash key comprises the retrieval of a plurality of timing data or canonical models.

At step 525, when the at least one input condition identifier or hash key does not match a value in the hash table, or when the canonical input data or conditions obtained in step 505 do not match the canonical input data or conditions associated with the value in the hash table (e.g., in the instance that the full compare is performed in optional step 515), then new timing data (e.g., the solution comprising the delays and slews or output slews) is calculated using the canonical input data or conditions that were obtained for the exemplary phase on the arc. At step 530, the at least one input condition identifier or hash key that did not match a value in the hash table is saved in the hash table for comparison purposes to subsequent phases of the same arc, and the canonical input data or conditions and the new timing data are saved in a cache or memory for later retrieval in association with the at least one input condition identifier or hash key. At step 535, the new timing data calculated in step 525 or the already calculated timing data retrieved in step 520 is applied to timing models for the exemplary phase such that the timing models may be used in SSTA to close timing for the IC design. Advantageously, the recycling of the existing timing data or solutions in step 520 allows embodiments of the present invention to efficiently avoid calculations (e.g., the calculations performed in step 525) that would conventionally result in known solutions and avoid storing duplicate solutions in the cache or memory.

At step 540, a determination is made as to whether there are additional phases on the present arc, which need timing data either calculated or retrieved. When the determination is that there are additional phases, the process starts over at step 505 by retrieving the canonical input data or conditions for the next phase on the arc. When the determination is that there are no additional phases on the present arc, the process continues at step 545 where the cache and hash table are cleared. Specifically, the values in the hash table specific to the present arc are cleared from the hash table and the canonical input data or conditions and timing data specific to the present arc are cleared from the cache such that the data for the present arc is not compared to data for other arcs in the IC design.

At step 550, a determination is made as to whether there are additional arcs in the present IC design that need timing data either calculated or retrieved. When the determination is that there are additional arcs the process continues at step 555 by retrieving any timing data present for the next arc and saving the data in the cache. When the determination is that there are no additional arcs in the present IC design, the process ends at step 560.

In additional or alternative embodiments, similar instances of input conditions (e.g., load conditions) known due to regularity (e.g., physical or logical regularity) may be identified such that the data re-use may apply beyond a single instance of a given timing gate. Where the prior embodiments ensured consistent input loads by applying on a single instance and therefore across the same load conditions, design regularity may be leveraged to identify identical loading conditions, maintaining source slew as the sole input variable. In these embodiments multiple instances of a given gate type are identified and flagged as having identical loading topology. Delay and output slew re-use may then apply to all such instances sharing a common loading topology, increasing opportunity for re-use, which in turn may reduce the runtime overhead.

Figure 6:
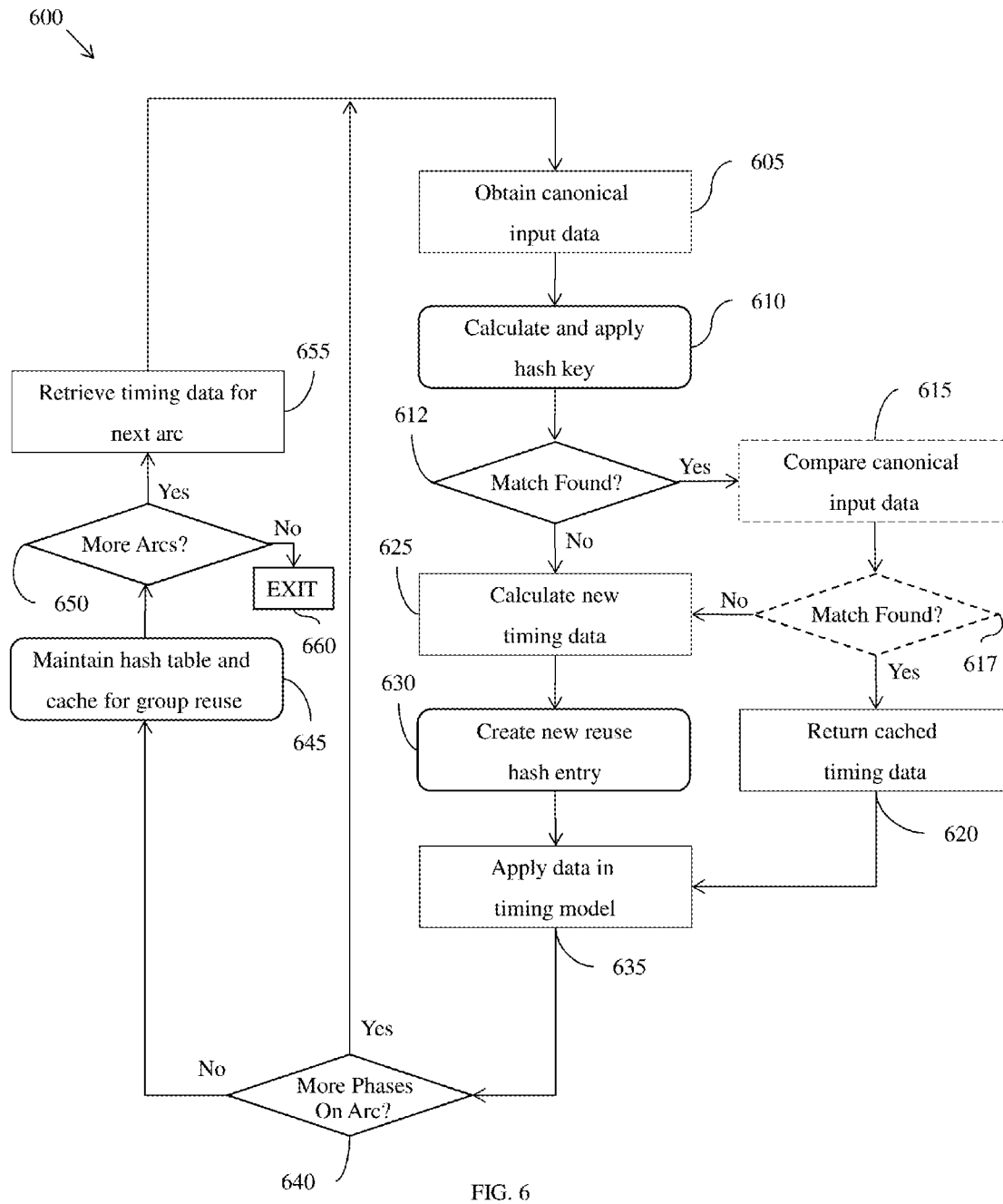

As shown in FIG. 6, the process 600 may start at step 605 where canonical input data or conditions are obtained for an exemplary phase on an arc. Steps 605-640 are similar to steps 505-540 discussed above with respect to process 500, and thus step 605-640 will not be discussed in detail with respect to process 600. At step 610, at least one input condition identifier or hash key is calculated and compared to values within the hash table. Optionally, the at least one input condition identifier or hash key may be calculated prior to the comparison with the hash table to tune the accuracy versus the performance of the comparison by allowing for fuzz or noise in the equivalence definition via variable tolerances.

At step 612, a determination is made as to whether the at least one input condition identifier or hash key matches at least one value within the hash table. When the determination is that there is a match, the process continues at optional step 615 or step 620. When the determination is that there is no match, the process continues at step 625.

Optionally, at step 615, when the at least one input condition identifier or hash key matches a value in the hash table, a full comparison of the canonical input data or conditions received in step 605 for the exemplary phase may be compared to the canonical input data or conditions cached and associated with the value in the hash table that had equivalence with the at least one input condition identifier or hash key. Optionally, the full comparison may utilize different fuzz or noise factors for different statistical parameters (e.g., different factors for mean, first order sensitivities, cross term, etc.) to allow for fuzz or noise in the equivalence definition via variable tolerances.

At step 617, a determination is made as to whether the canonical input data or conditions received in step 605 match the canonical input data or conditions cached and associated with the value in the hash table. When the determination is that there is a match, the process continues at step 620. When the determination is that there is no match, the process continues at step 625.

At step 620, when the at least one input condition identifier or hash key matches a value in the hash table, and/or when the canonical input data or conditions received in step 605 matches the canonical input data or conditions associated with the value in the hash table (e.g., in the instance that the full compare is performed in optional step 615), the timing data (e.g., the solution comprising the delays and slews or output slews) already calculated and associated with the value in the hash table is retrieved from the cache or memory.

At step 625, when the at least one input condition identifier or hash key does not match a value in the hash table, or when the canonical input data or conditions received in step 605 do not match the canonical input data or conditions associated with the value in the hash table (e.g., in the instance that the full compare is performed in optional step 615), then new timing data (e.g., the solution comprising the delays and slews or output slews) is calculated using the canonical input data or conditions that were obtained for the exemplary phase on the arc. At step 630, the at least one input condition identifier or hash key that did not match a value in the hash table is saved in the hash table for comparison purposes to subsequent phases of the same arc on either the same instance of the current gate, or on other instances of the same gate type under identical loading conditions (as identified via regularity analysis), and the canonical input data or conditions and the new timing data are saved in a cache or memory for later retrieval in association with the at least one input condition identifier or hash key. At step 635, the new timing data calculated in step 625 or the already calculated timing data retrieved in step 620 is applied to timing models for the exemplary phase such that the timing models may be used in SSTA to close timing for the IC design. Advantageously, the recycling of the existing timing data or solutions in step 620 allows embodiments of the present invention to efficiently avoid calculations (e.g., the calculations performed in step 625) that would conventionally result in known solutions and avoid storing duplicate solutions in the cache or memory.

At step 640, a determination is made as to whether there are additional phases on the present arc, which need timing data either calculated or retrieved. When the determination is that there are additional phases the process starts over at step 605 by retrieving the canonical input data or conditions for the next phase on the arc. When the determination is that there are no additional phases on the present arc, the process continues at step 645 where the hash table and cache are maintained for group reuse between instances known to exhibit regularity (e.g., between two different arcs known to exhibit similar load conditions). Specifically, the values in the hash table specific to the present arc are maintained in the hash table as a grouping, and the canonical input data or conditions and timing data specific to the present arc are maintained in the cache as a grouping such that the data for the present arc may be compared to data for other arcs in the IC design exhibiting regularity with the present arc.

At step 650, a determination is made as to whether there are additional arcs exhibiting regularity with the present arc in the present IC design that need timing data either calculated or retrieved. When the determination is that there are additional arcs the process continues at step 655 by retrieving any timing data present for the next arc and saving the data in the cache. When the determination is that there are no additional arcs in the present IC design that exhibit regularity with the present arc, the process ends at step 660.

In additional or alternative embodiments, the comparisons are not limited by using similar instances of input conditions known by construction or definition, or known by regularities, such that input conditions (e.g., the load) may be dropped from the comparison. Instead, input conditions such as the load conditions are compared similarly to the source or input slew comparisons described above with respect to processes 500 and 600. For example, the loads and the source or input slews are compared over multiple arcs comprising multiple phases that are not grouped or limited by definition or regularities. In embodiments, the input conditions may also include guard time, which is the additional time that it takes to latch a data signal and a clock signal (i.e., another measure of delay). Guard time is particularly applicable to compares between phases that are not limited by definition or regularities because guard time is not load dependent, and thus exhibits increased opportunities for reuse across an IC design.

Figure 7:
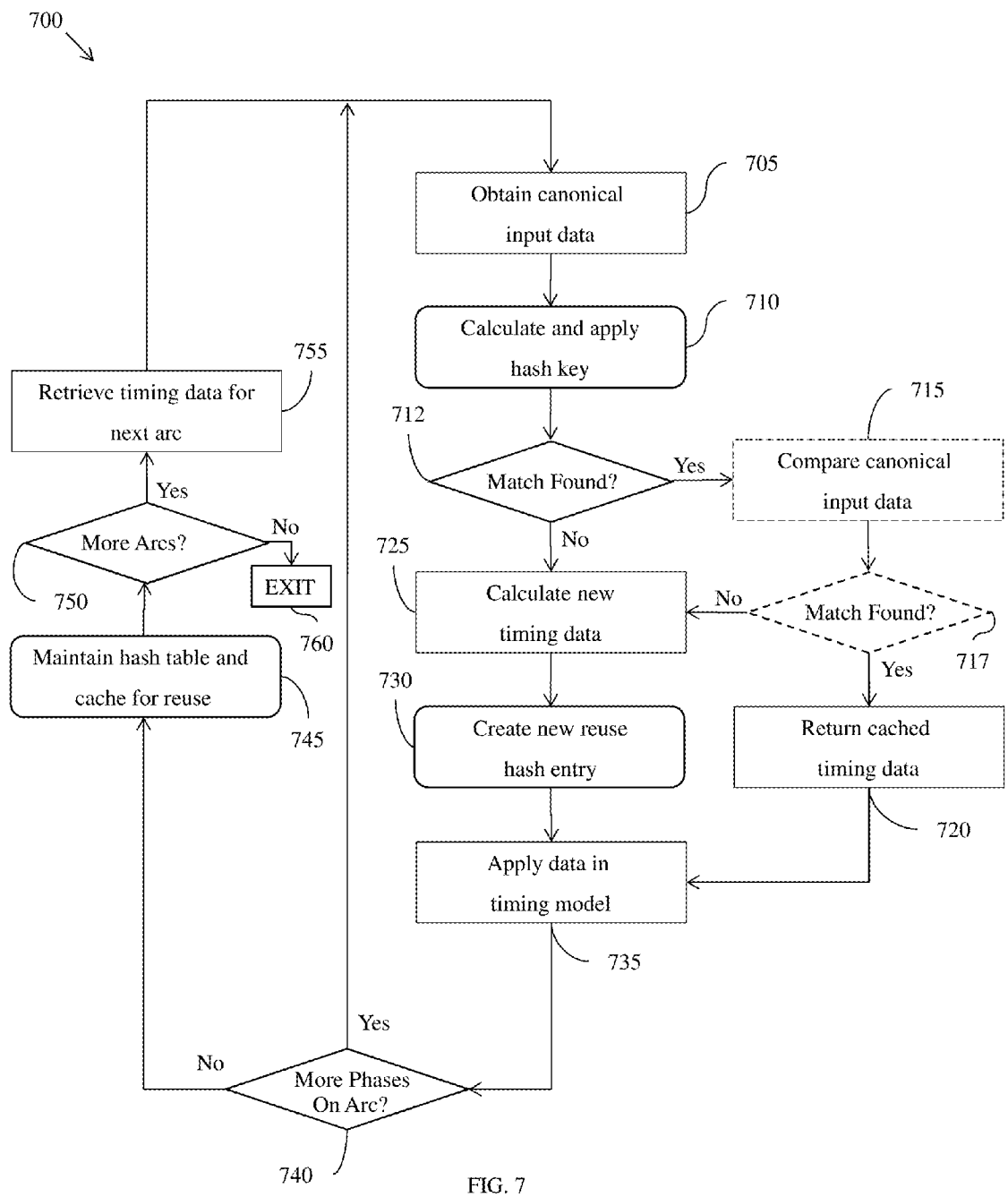

As shown in FIG. 7, the process 700 may start at step 705 where canonical input data or conditions are obtained for an exemplary phase on an arc. Steps 705-740 are similar to steps 505-540 discussed above with respect to process 500, and thus step 705-740 will not be discussed in detail with respect to process 700. At step 710, at least one input condition identifier or hash key is calculated and compared to values within the hash table. Optionally, the at least one input condition identifier or hash key may be calculated prior to the comparison with the hash table to tune the accuracy versus the performance of the comparison by allowing for fuzz or noise in the equivalence definition via variable tolerances.

At step 712, a determination is made as to whether the at least one input condition identifier or hash key matches at least one value within the hash table. When the determination is that there is a match, the process continues at optional step 715 or step 720. When the determination is that there is no match, the process continues at step 725.

Optionally, at step 715, when the at least one input condition identifier or hash key matches a value in the hash table, a full comparison of the canonical input data or conditions received in step 705 for the exemplary phase may be compared to the canonical input data or conditions cached and associated with the value in the hash table that had equivalence with the at least one input condition identifier or hash key. Optionally, the full comparison may utilize different fuzz or noise factors for different statistical parameters (e.g., different factors for mean, first order sensitivities, cross term, etc.) to allow for fuzz or noise in the equivalence definition via variable tolerances.

At step 717, a determination is made as to whether the canonical input data or conditions received in step 705 match the canonical input data or conditions cached and associated with the value in the hash table. When the determination is that there is a match, the process continues at step 720. When the determination is that there is no match, the process continues at step 725.

At step 720, when the at least one input condition identifier or hash key matches a value in the hash table, and/or when the canonical input data or conditions received in step 705 matches the canonical input data or conditions associated with the value in the hash table (e.g., in the instance that the full compare is performed in optional step 715), the timing data (e.g., the solution comprising the delays and slews or output slews) already calculated and associated with the value in the hash table is retrieved from the cache or memory.

At step 725, when the at least one input condition identifier or hash key does not match a value in the hash table, or when the canonical input data or conditions received in step 705 do not match the canonical input data or conditions associated with the value in the hash table (e.g., in the instance that the full compare is performed in optional step 715), then new timing data (e.g., the solution comprising the delays and slews or output slews) is calculated using the canonical input data or conditions that were obtained for the exemplary phase on the arc. At step 730, the at least one input condition identifier or hash key that did not match a value in the hash table is saved in the hash table for comparison purposes to subsequent phases of the same arc, and the canonical input data or conditions and the new timing data are saved in a cache or memory for later retrieval in association with the at least one input condition identifier or hash key. At step 735, the new timing data calculated in step 725 or the already calculated timing data retrieved in step 720 is applied to timing models for the exemplary phase such that the timing models may be used in SSTA to close timing for the IC design. Advantageously, the recycling of the existing timing data or solutions in step 720 allows embodiments of the present invention to efficiently avoid calculations (e.g., the calculations performed in step 725) that would conventionally result in known solutions and avoid storing duplicate solutions in the cache or memory.

At step 740, a determination is made as to whether there are additional phases on the present arc, which need timing data either calculated or retrieved. When the determination is that there are additional phases the process starts over at step 705 by retrieving the canonical input data or conditions for the next phase on the arc. When the determination is that there are no additional phases on the present arc, the process continues at step 745 where the hash table and cache are maintained for reuse with respect to the present IC design. Specifically, the values in the hash table specific to the present arc are maintained in the hash table, and the canonical input data or conditions and timing data specific to the present arc are maintained in the cache such that the data for the present arc may be compared to data for all other arcs in the IC design.

At step 750, a determination is made as to whether there are additional arcs in the present IC design that need timing data either calculated or retrieved. When the determination is that there are additional arcs the process continues at step 755 by retrieving any timing data present for the next arc and saving the data in the cache. When the determination is that there are no additional arcs in the present IC design, the process ends at step 660.

As should be understood, the process 500 comprising the reuse of timing data over a single arc (e.g., the sharing of data between phases of a same arc) generally requires the least amount of cache or memory space and the least number of complex comparisons, as compared to processes 600 and 700, because the timing data for loads is being dropped from the comparison and the data being stored in the hash table and cache only pertains to a single arc. Consequently, the efficiencies obtained from avoiding calculations that would result in known solutions in process 500 should significantly outweigh any full compares performed during the process.

The process 600 comprising the reuse of timing data over multiple arcs that exhibit regularity generally requires a moderate amount of cache or memory space, and a moderate number of complex comparisons, as compared to processes 500 and 700, because the timing data for loads is being dropped from the comparison and the data being stored in the hash table and cache pertains to a grouping of arcs exhibiting regularity. Consequently, the efficiencies obtained from avoiding calculations that would result in known solutions in process 600 should significantly outweigh any full compares performed during the process.

The process 700 comprising the reuse of timing data over all arcs in the IC design generally requires the most amount of cache or memory space, and the greatest number of complex comparisons, as compared to processes 500 and 600, because the timing data for loads may be compared and the data being stored in the hash table and cache pertains to all arcs of the IC design. Nonetheless, the efficiencies obtained from avoiding calculations that would result in known solutions in process 700 should significantly outweigh any full compares performed during the process.

Advantageously, the recycling of the existing timing data or solutions in processes 500, 600, and 700 allows embodiments of the present invention to efficiently avoid calculations that would conventionally result in known solutions and avoid storing duplicate solutions in the hash table, cache, and/or memory. More specifically, reused results in accordance with aspects of the invention are by definition identical results and only a single copy of the redundant reused data is stored in the hash table, cache, and/or memory such that all instances in which the redundant reuse data is used in timing models point to a single shared canonical. Accordingly, it should be understood to those of skill in the art that the hash table, cache, and/or memory should be monitored for garbage collection of unused or outdated redundant reuse data to maintain the efficiencies gained by the present methods and systems. For example, a count of the instances in which the redundant reuse data is used in the timing models may be maintained, and when the count reaches zero the single instance of the shared canonical data may be purged from the hash table, cache, and/or memory.

Additionally those of ordinary skill in the art should understand that the use of the systems and methods described herein with respect to distribution data and specific timing quantities (such as load, source or input slew, output slew, guard time, etc.) is illustrative of one exemplary use and that other uses (e.g., uses for deterministic data and other types of timing quantities) for the systems and methods described herein are contemplated by the invention, all of which do not depart from the scope and spirit of the invention. For example, the system and methods of the present invention can be applied to propagated as well as calculated timing quantities (e.g., ATs, RATs, common path pessimism removal (CPPR) adjusts, etc.). More specifically, in the instance of single input timing points, only a pointer compare may be required. If an upstream timing point shares data, and the arc shares the same data, then the current point may also share the data with no calculations required. In the instance that some data differs only by a constant or know adjustment, e.g., data for arrival times at a primary input). The instance may be flagged and dynamically adjusted when the data is required. Otherwise, the processes may allow different phases to be propagated using the shared data.

Design Process

Figure 8:
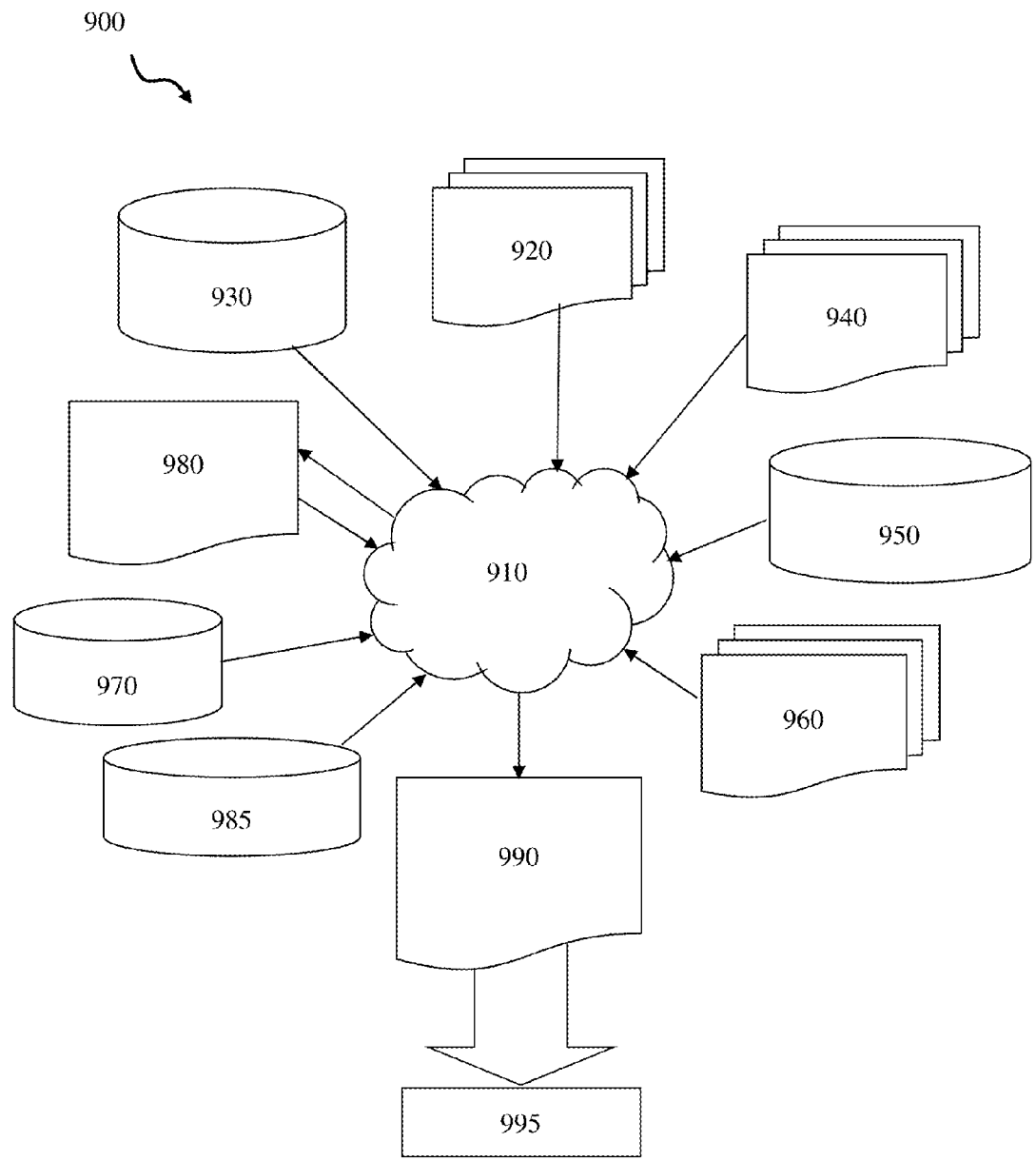
FIG. 8 is a flow diagram of a design process used in semiconductor design, manufacture, and/or test.

FIG. 8 is a flow diagram of a design process used in semiconductor design, manufacture, and/or test used with the system and method of the present invention. FIG. 8 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system, which can be implemented with the method and system of the present invention. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more devices. In one embodiment, design structure 990 may comprise a compiled, executable HDL simulation model that functionally simulates the devices.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
  obtaining canonical input data;
  calculating at least one input condition identifier based on the canonical input data;
  comparing the at least one input condition identifier to a table of values; and
  when a match exists between the at least one input condition identifier and at least one value within the table of values, retrieving previously calculated timing data associated with the at least one value, and applying the previously calculated timing data in a timing model for a design under timing analysis; and when a match does not exist between the at least one input condition identifier and the at least one value within the table of values, calculating timing data for the at least one input condition identifier, saving the at least one input condition identifier as a value in the table of values, and applying the calculated timing data for the at least one input condition identifier in the timing model for the design under timing analysis, wherein at least the comparing is performed using a processor.

2. The method of claim 1, wherein the canonical input data is for a first phase on a first arc in the design under timing analysis.

3. The method of claim 2, further comprising:
determining whether additional phases on the first arc exist that need timing data either calculated or retrieved;
when the determination is that there are additional phases, retrieving canonical input data for a second phase on the first arc; and
when the determination is that there are no additional phases, clearing the table of values and a cache,
wherein the previously calculated timing data is retrieved from the cache.

4. The method of claim 2, further comprising:
determining whether additional phases on the first arc exist that need timing data either calculated or retrieved;
when the determination is that there are additional phases, retrieving canonical input data for a second phase on the first arc; and
when the determination is that there are no additional phases, maintaining the table of values and a cache for group reuse between arcs known to exhibit regularity,
wherein the previously calculated timing data is retrieved from the cache.

5. The method of claim 2, further comprising:
determining whether additional phases on the first arc exist that need timing data either calculated or retrieved;
when the determination is that there are additional phases, retrieving canonical input data for a second phase on the first arc; and
when the determination is that there are no additional phases, maintaining the table of values and a cache for reuse between all arcs for the design under timing analysis,
wherein the previously calculated timing data is retrieved from the cache.

6. A method comprising:
obtaining canonical input data;
calculating at least one input condition identifier based on the canonical input data;
comparing the at least one input condition identifier to a table of values; and
when a match exists between the at least one input condition identifier and at least one value within the table of values, retrieving previously calculated timing data associated with the at least one value, and applying the previously calculated timing data in a timing model for a design under timing analysis,
wherein:
at least the comparing is performed using a processor;
the at least one input condition identifier is calculated prior to the comparing the at least one input condition identifier to the table of values; and the at least one input condition identifier is calculated using variable tolerances to allow for noise in an equivalence definition utilized for the comparing the at least one input condition identifier to the table of values.

7. A method comprising:
obtaining canonical input data;
calculating at least one input condition identifier based on the canonical input data;
comparing the at least one input condition identifier to a table of values; and
when a match exists between the at least one input condition identifier and at least one value within the table of values, retrieving previously calculated timing data associated with the at least one value, and applying the previously calculated timing data in a timing model for a design under timing analysis,
wherein:
at least the comparing is performed using a processor; and
the at least one input condition identifier is calculated as a single value via at least one of summation, user definable scalar, and an integer cast of the canonical input data.

8. A method comprising:
obtaining canonical input data;
calculating at least one input condition identifier based on the canonical input data;
comparing the at least one input condition identifier to a table of values; and
when a match exists between the at least one input condition identifier and at least one value within the table of values, retrieving previously calculated timing data associated with the at least one value, and applying the previously calculated timing data in a timing model for a design under timing analysis,
wherein:
at least the comparing is performed using a processor;
when a match exists between the at least one input condition identifier and at least one value within the table of values, comparing the obtained canonical input data to canonical input data associated with the at least one value; and
when the obtained canonical input data matches the canonical input data associated with the at least one value, retrieving the previously calculated timing data associated with the at least one value.

9. The method of claim 8, further comprising determining an equivalence definition using variable tolerances to allow for noise in the comparing the obtained canonical input data to the canonical input data associated with the at least one value.

10. A method for performing timing analysis, comprising:
obtaining canonical input data;
calculating and applying at least one slew identifier based on the canonical input data;
comparing the at least one slew identifier to a table of values;
when the at least one slew identifier is a match to at least one value within the table of values, comparing the obtained canonical input data to canonical input data associated with the at least one value;
when the at least one slew identifier is not a match to the at least one value within the table of values, calculating timing data for the at least one slew identifier and saving the at least one slew identifier as a value in the table of values;
when the obtained canonical input data matches the canonical input data associated with the at least one value, retrieving previously calculated timing data associated with the at least one value; and applying the previously calculated timing data in a timing model for a design under timing analysis, wherein at least the comparing the obtained canonical input data to the canonical input data associated with the at least one value is performed using a processor.

11. The method of claim 10, further comprising when the at least one slew identifier is not a match to the at least one value within the table of values, applying the calculated timing data for the at least one slew identifier in the timing model for the design under timing analysis.

12. The method of claim 10, wherein the canonical input data is for a first phase on a first arc in the design under timing analysis.

13. The method of claim 12, further comprising:
determining whether additional phases on the first arc exist that need timing data either calculated or retrieved;
when the determination is that there are additional phases, retrieving canonical input data for a second phase on the first arc; and
when the determination is that there are no additional phases, clearing the table of values and a cache,
wherein the previously calculated timing data is retrieved from the cache.

14. The method of claim 12, further comprising:
determining whether additional phases on the first arc exist that need timing data either calculated or retrieved;
when the determination is that there are additional phases, retrieving canonical input data for a second phase on the first arc; and
when the determination is that there are no additional phases, maintaining the table of values and a cache for group reuse between arcs known to exhibit regularity,
wherein the previously calculated timing data is retrieved from the cache.

15. The method of claim 12, further comprising:
determining whether additional phases on the first arc exist that need timing data either calculated or retrieved;
when the determination is that there are additional phases, retrieving canonical input data for a second phase on the first arc; and
when the determination is that there are no additional phases, maintaining the table of values and a cache for reuse between all arcs for the design under timing analysis,
wherein the previously calculated timing data is retrieved from the cache.

16. A computer program product comprising a computer readable storage memory device having readable program code embodied in the storage memory device, the computer program product includes at least one component operable to:
obtain canonical input data;
calculate at least one input condition identifier based on the canonical input data;
compare the at least one input condition identifier to a table of values; and
when the at least one input condition identifier is a match to at least one value within the table of values, compare the obtained canonical input data to canonical input data associated with the at least one value;
when the at least one input condition identifier is not a match to the at least one value within the table of values, calculate timing data for the at least one input condition identifier, save the at least one input condition identifier as a value in the table of values, and apply the calculated timing data for the at least one input condition identifier in a timing model for a design under timing analysis; and
when the obtained canonical input data matches the canonical input data associated with the at least one value, retrieve previously calculated timing data associated with the at least one value and apply the previously calculated timing data in the timing model for the design under timing analysis.

17. The computer program product of claim 16, wherein the canonical input data is for a first phase on a first arc in the design under timing analysis.

18. The computer program product of claim 17, wherein the at least one component is further operable to:
determine whether additional phases on the first arc exist that need timing data either calculated or retrieved;
when the determination is that there are additional phases, retrieve canonical input data for a second phase on the first arc; and
when the determination is that there are no additional phases, clear the table of values and a cache,
wherein the previously calculated timing data is retrieved from the cache.

19. The computer program product of claim 16, wherein the canonical input data is for a first phase on a first arc in the design under timing analysis, and the at least one input condition identifier is representative of a source slew calculated for the first phase.

* * * * *